United States Patent [19]

Reinsma

[11] 4,428,589
[45] Jan. 31, 1984

[54] DUAL OPERATING MODE SEAL ASSEMBLY

[75] Inventor: Harold L. Reinsma, Dunlap, Ill.

[73] Assignee: Capterpillar Tractor Co., Peoria, Ill.

[21] Appl. No.: 481,602

[22] Filed: Apr. 4, 1983

[51] Int. Cl.³ .................................. F16J 15/24
[52] U.S. Cl. ........................ 277/101; 277/165; 277/177; 277/186; 277/DIG. 6; 305/11
[58] Field of Search ............. 277/84, 92, 95, 101, 277/151, 165, 177, 182, 186, DIG. 6; 305/11-13

[56] References Cited

U.S. PATENT DOCUMENTS

| | | | |
|---|---|---|---|
| 2,911,840 | 11/1959 | Muller et al. | 305/11 X |
| 2,935,860 | 5/1960 | Miller | 277/95 X |
| 3,158,923 | 12/1964 | Reinsma | 29/149.5 |
| 3,188,152 | 6/1965 | Miller | 308/36.1 |
| 3,218,107 | 11/1965 | Reinsma | 305/11 |
| 3,357,758 | 12/1967 | Miller | 308/26 |
| 3,397,928 | 8/1968 | Galle | 277/92 X |
| 3,603,618 | 9/1971 | Stratton | 277/101 X |
| 3,620,578 | 11/1971 | Fix | 305/11 |
| 3,636,824 | 1/1972 | Clark | 277/165 X |
| 3,860,250 | 1/1975 | Lundquist | 277/165 |
| 4,151,999 | 5/1979 | Ringel | 277/165 |
| 4,244,588 | 1/1981 | Langewisch | 305/11 X |
| 4,253,674 | 3/1981 | Fee | 277/165 X |
| 4,324,114 | 4/1982 | Durham | 277/165 X |
| 4,330,134 | 5/1982 | Kolinger | 277/42 |

*Primary Examiner*—Robert S. Ward
*Attorney, Agent, or Firm*—O. Gordon Pence

[57] ABSTRACT

A dual operating mode seal assembly (10) wherein a frictional force maintains a seal ring (50) in a static sealing mode during either movements of a member (16) being sealed to eliminate frictional and abrasive wear to the seal ring (50) and member (16). A load ring (52) provides a shear force upon deflection sufficient to overcome the frictional force at a predetermined slip point to cause the seal ring (50) to enter a dynamic sealing mode in response to extended travel movements of the member (16).

11 Claims, 3 Drawing Figures

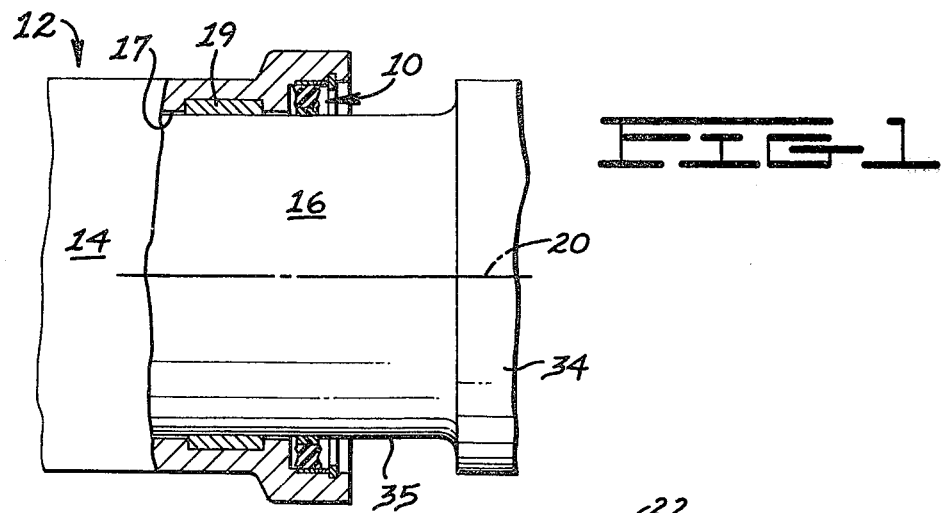
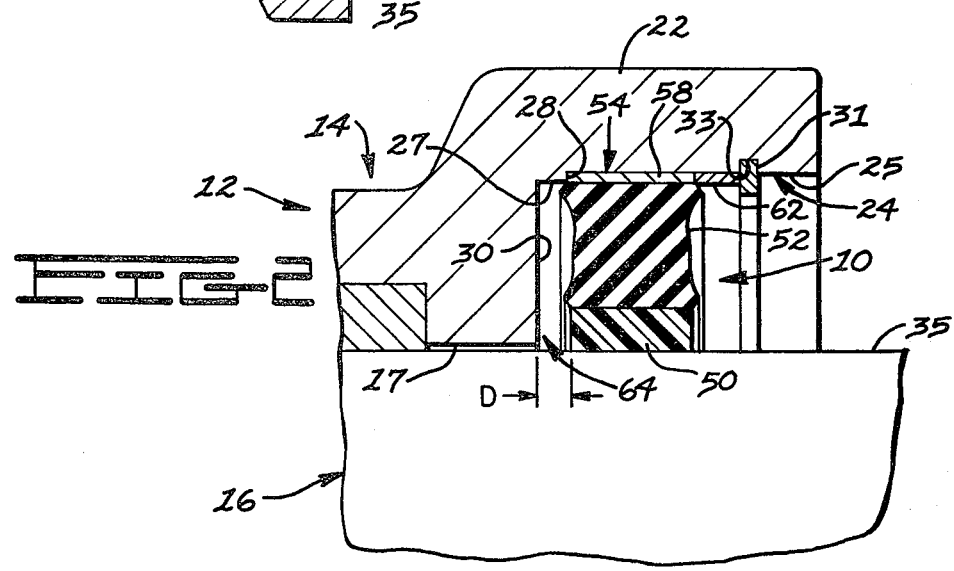
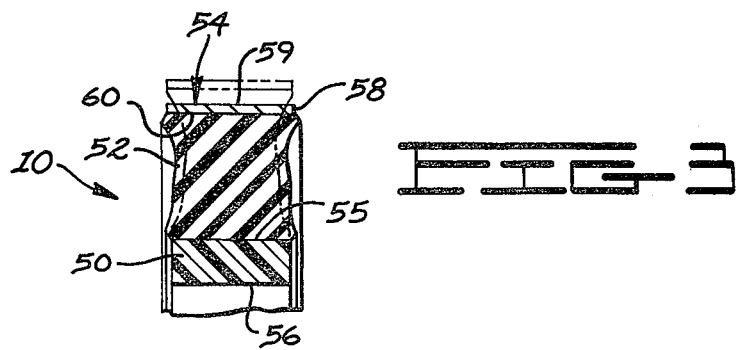

4,428,589

DUAL OPERATING MODE SEAL ASSEMBLY

DESCRIPTION

BACKGROUND ART

This invention relates generally to seals and, more particularly, to radial seals for sealing a cylindrical surface of a movable member.

Many types of seal configurations have been employed for sealing rotating or reciprocating cylinders or shafts. Each type of seal configuration is adapted to perform well under certain operating conditions, but is less well suited for other conditions.

For instance, lip type seals are particularly well suited for dynamic applications. In a dynamic application, the lip of the seal slides either axially or rotationally upon the surface being sealed.

Another type of dynamic seal, disclosed in U.S. Pat. No. 4,151,999, issued to Ringel et al. on May 1, 1979 and assigned to the assignee hereof, has an inner nylon seal ring which provides dynamic sealing capability against a rotating shaft in a non-lubricated environment.

In applications where only a small amount of movement is all that ever occurs, a shear-type seal may be employed. U.S. Pat. No. 3,158,923, issued Dec. 1, 1964 to Reinsma and also assigned to the assignee hereof, shows a typical shear-type seal employed in a track joint assembly. A track joint has only limited angular movement which is accommodated through flexure of an elastic ring seal member.

However, in some applications, seals must contend with both dynamic and small movement conditions. The recoil cylinder for a track recoil mechanism of a track-type vehicle is such an application. In addition, such seal is exposed to adverse environmental conditions. The recoil cylinder seal must not only seal lubricant within the recoil mechanism, it must also seal out highly abrasive materials, such as sand and mud, and be able to seal out those materials after they have become dried and caked or after being frozen about the cylinder. As a consequence, such seal must be extremely abrasion resistant and tough so as to withstand such adverse conditions.

Upon recoil, the recoil cylinder moves axially a distance frequently in excess of 50 millimeters. This movement is referred to herein as extended travel-type movement. This extent of movement requires dynamic sealing capability of the seal. Recoil movements occur only when the track hits an obstruction or when an object, such as a rock, becomes temporarily lodged in the track. Such occurrences happen relatively infrequently.

In addition to the above recoil movements, it has been found that the recoil cylinder also experiences a high number of much smaller movements, referred to herein as dither-type movements. It has been found that these dither-type movements are principally caused by the repetitious impacting of the track links against the idler wheel as the track travels about the idler during vehicle operation. These dither movements can be radial, orbital, and axial.

With the use of a conventional dynamic seal, these dither movements cause rapid, deleterious wear of the seal. Even more serious is the damage caused to the cylinder itself. The small, repetitious movements between the seal and the cylinder at one localized area on the cylinder in the presence of abrasives causes a groove to be cut into the cylinder under the seal. This undue wear and damage results in loss of sealing and also necessitates the premature replacement of both the seal and cylinder, resulting in undue waste and downtime for the vehicle.

The present invention is directed to overcome one or more of the problems as set forth above.

DISCLOSURE OF THE INVENTION

In accordance with one aspect of the present invention, a radial seal assembly is adapted for sealing a movable member and is provided with an inner seal ring positionable about the member, an elastomeric load ring disposed about the seal ring and apparatus for maintaining the load ring in a radially compressed condition. The seal ring is of a tough, abrasion resistant material having a predetermined static coefficient of friction with the member. The compressed condition of the load ring, in conjunction with the static coefficient of friction, provides a frictional force sufficient to maintain the seal ring in a static sealing mode relative to the member during dither movements of the member. The load ring has a shear force developed in response to extended travel movements of the member. The shear force is sufficient to overcome the frictional force at a predetermined slip point.

Thus, the seal assembly is of a construction such that no relative movement occurs between the seal and the movable member during dither movements of the member. This eliminates any abrasive wear of either the seal or the member during dither movement. On the other hand, the seal assembly is also constructed so that it slips on the member and seals dynamically during extended travel movements of the member, thereby allowing free movement of the member.

BRIEF DESCRIPTION OF THE DRAWINGS

In the drawings:

FIG. 1 is a fragmentary cross-sectional view of a track recoil mechanism incorporating a seal assembly embodying the principles of the present invention.

FIG. 2 is an enlarged fragmentary portion of the seal assembly shown in FIG. 1.

FIG. 3 is an enlarged cross-sectional view of the seal assembly without the recoil mechanism.

BEST MODE FOR CARRYING OUT THE INVENTION

Referring more particularly to the drawings, a seal assembly embodying the principles of the present invention is generally depicted at 10 in FIG. 1. The seal assembly 10 is particularly adapted for use in severe sealing applications and is capable of sealing in a dual operating mode, wherein the seal assembly 10 is adapted to seal, first, in a static sealing mode in response to low magnitude, high frequency type movements, hereinafter referred to as dither movements, and, second, in a dynamic sealing mode in response to high magnitude, low frequency type movements, hereinafter referred to as extended travel movements.

Both dither and extended travel movements may be encountered in many sealing applications, such as for instance, in a track recoil mechanism 12 for a track-type vehicle, not shown. Those skilled in the art will appreciate that a recoil mechanism 12 is part of the track undercarriage of such a vehicle, the undercarriage being the structure which supports the endless track used to propel the vehicle, all of which are not shown and are not intended to form any part of the subject invention.

In the illustrated application, the recoil mechanism 12 includes an elongated stationary housing 14 and a recoil cylinder 16. The housing 14 has a large central bore 17 and a bearing 19 carried within the bore 17 for mounting the cylinder 16 for sliding or reciprocative movement along an axis 20 of the cylinder. As best shown in FIG. 2, the housing 14 is preferably provided with a radially enlarged end portion 22 through which the bore 17 opens. The end portion 22 accommodates a stepped counterbore 24 for receiving the seal assembly 10. The counterbore 24 includes a first cylindrical surface 25, a second smaller cylindrical surface 27, a first radial shoulder 28 between the first and second surfaces 25 and 27 and a second radial shoulder 30 between the second surface 27 and the bore 17. The housing 14 can also include a snap ring 31 disposed within a suitable groove 33 for retaining the seal assembly 10.

To fully appreciate the function and operation of the recoil mechanism 12, it should be noted that the outer end portion 34 of the recoil cylinder 16 is connected to and rotatably mounts an idler wheel, not shown, by way of any suitable known structure, also not shown. It should also be understood that the portion of the recoil cylinder 16 extending from the housing 14 externally of the seal assembly 10 is exposed to the environment and, therefore, its cylindrical sealing and bearing surface 35 is preferably of a corrosion resistant material, such as chromium or stainless steel. The recoil cylinder 16 is normally biased toward an extended position (toward the right as shown in FIG. 1), by any suitable means, such as a large coil spring or the like, not shown. In operation, when a sufficiently larger force is exerted on the idler wheel, the recoil cylinder 16 moves axially to the left as shown in the drawings or retracts into the housing 12 to prevent damage to any of the various components of the undercarriage. Those skilled in the art will appreciate that such forces occur due to impact with obstructions or due to objects becoming temporarily lodged between the track and the undercarriage. The full extent of such recoil is typically between 50 and 100 millimeters, depending on the size of the track-type vehicle on which the recoil mechanism 12 is employed. Thus, the extended travel movement in the above-described recoil application is in an axial direction along the axis 20 of the cylinder 16.

It is also contemplated that the seal assembly 10 may be employed in applications where the extended travel movement occurs in a rotational direction and it is not intended that the particular recoil application described herein be limiting on the present invention.

Referring now more particularly to FIGS. 2 and 3, the seal assembly 10 of the present invention includes an inner seal ring 50, a load ring 52, and means 54 for maintaining the load ring in a predetermined radially compressed condition.

The seal ring 50 includes an outer peripheral surface 55 and an inner peripheral sealing surface 56. The inner surface 56 is sized so as to be positionable in close fitting sealing contact with the cylindrical surface 35 of the cylinder 16. The load ring 52 is of an elastomeric material.

The means 54 for maintaining the load ring 52 in a compressed state preferably includes a metal retaining ring 58. The load ring 52 is preferably compressed by swagging the retaining ring 58 to a predetermined reduced diameter size after being mounted about the load ring. It is preferred that the cross-sectional radial height of the load ring 52 in its free state be compressed between 15 to 20% by the swagging of the retaining ring 58. This compressing of the load ring 52 applies a predetermined radially inwardly directed force on the seal ring 50, the purpose of which will be subsequently described. The retaining ring 58 is adapted to retain its swagged size under load from the load ring 52. However, it should be understood that the maintaining means 54 could be provided by fitting the load ring 52 into a properly sized counterbore 24 of the housing 14 without departing from the intent of the present invention.

The retaining ring 58 has an outer peripheral surface 59 and an inner peripheral surface 60. The outer surface 59 is sized to be received in a press-fit relationship with the first cylindrical surface 25 of the counterbore 24 to secure the seal assembly 10 to the housing 14 and provide a static seal therebetween. It is also preferable that the inner end of the retaining ring 58 abut the first shoulder 28 with the other end abutting a spacer 62, which, in turn, abuts the snap ring 31 to positively axially secure the seal assembly 10 to the housing 14. The inner surface 60 of the retaining ring 58 is secured to the outer periphery of the load ring 52. The inner periphery of the load ring 52 is secured to the outer surface 55 of the seal ring 50. The securing of the load ring 52 to the seal ring 50 and the retaining ring 58 should be sufficient to withstand shear forces developed in the load ring 52 in response to extended travel movements of the cylinder 16. A chemical vulcanized bond has been found to be suitable for this purpose.

In the recoil cylinder application, the seal assembly 10 can be enhanced through the use of a positive overstrain prevention means or stop 64. As best shown in FIG. 2, the stop 64 can be provided by the second radial shoulder 30 of the counterbore 24. The stop 64 is disposed a predetermined axial distance D behind the seal assembly 10 and adapted to abut the seal ring 50 upon recoil of the cylinder 16. This is to limit the amount of axial deflection which can occur in the load ring 52. This positive stop 64 is intended to come into play when conditions are present which would hinder or resist the slipping of the seal ring 50 on the cylinder 16. Such conditions can exist due to the build up of material, such as frozen or caked mud, on the exposed portion of the cylinder surface 35 externally of the seal assembly 10. Under such conditions, additional assistance may be required in order to scrape such material away from the cylinder surface 35 upon recoil.

INDUSTRIAL APPLICABILITY

The seal assembly 10 of the present invention has general applicability in sealing extended travel movements in both axial and rotational directions and is particularly adapted to accommodate dither-type movements occurring in such applications in addition to such extended travel movements.

To accommodate both dither and extended travel movements, several interrelated desiderate need be considered. As a usual starting point, the environment in which the seal assembly 10 will operate and the conditions to which it will be exposed need be determined to select appropriate material compositions of the components of the seal assembly 10. In the recoil cylinder application, for instance, the seal assembly 10 will be exposed to oil on one side and highly abrasive materials on the other.

Accordingly, the seal ring 50 of a tough, abrasion resistant material with good sealability, such as nylon, is preferable. The load ring 52 is preferably of a neoprene owing to its oil and aging resistance. The neoprene is also preferable because of its low cost and its low compression set and good resiliency characteristics.

The amplitude and frequency of the dither movements should also be considered in order to provide the load ring 52 with an appropriate cross-sectional size and configuration. In this regard, the load ring 52 is provided with a cross-sectional radial height in its compressed state in a predetermined relationship to the maximum amount of deflection the load ring 32 will experience from the dither movements. It is further desirable that the ratio of this deflection to the radial height be sufficiently small such that the load ring 52 will have an infinite fatigue life in that the load ring 52 would not be expected to fail by fatigue during the expected life of the vehicle.

To achieve the static sealing mode, the seal assembly 10 must have a predetermined braking or frictional force. To achieve the dynamic sealing mode, a countervailing driving force is required. The frictional force must be sufficient to maintain the seal ring 50 in static sealing engagement with the cylinder surface 35 during all dither movements. The driving force, on the other hand, must be sufficient to overcome the frictional force at a predetermined slip point and cause the seal ring 50 to slip and dynamically seal on the cylinder surface 35.

The frictional force is determined by the earlier mentioned radially inwardly directed force on the seal ring 50 caused by the compression of the load ring 52 and by the coefficient of friction between the seal ring 50 and the cylinder surface 35. The radially inwardly directed force also functions to urge the seal ring 50 into intimate sealing contact with cylinder surface 35.

The driving force to the seal ring 50 is provided by the load ring's resistance to being deflected. The magnitude of the driving force is determined by the amount of deflection and the shear modulus of the elastomeric material of the load ring 52.

By proper balancing of this resistive or shear force produced by the load ring 52 with the frictional force, the amount of movement required for slippage to occur is at least as great as, or, preferably, greater than the corresponding maximum amount of dither movement which the cylinder 16 will experience during operation. Thus, the seal assembly 10 is provided with a slip point which is outside the range of the dither movements. As a consequence, no relative movement occurs between the seal ring 50 and the cylinder 16 during such dither movements, thereby eliminating any wear to either component as a result of such movement. Such dither movements are advantageously accommodated entirely through the flexing of the elastomeric load ring 52. As mentioned earlier, the load ring 52 is preferably of a construction that it can withstand such flexing as caused by the dither movements without fatigue failure.

The extended travel movements, on the other hand, are accommodated initially by flexing of the load ring 52 and then to a greater extent through slippage of the seal ring 50 on the cylinder 16. Such slippage occurs when the slip point of the seal assembly 10 is exceeded. The slip point is selected to occur before the stress of the load ring 52 exceeds a predetermined maximum which preferably is sufficient to provide the load ring 52 with a fatigue life exceeding one megacycle.

Slippage is effected by the advantageous utilization of the shear force which develops in the load ring 52 when deflected in response to movement of the seal ring 50 with the cylinder 16. This shear force, of couse, increases in proportion to the magnitude of and in a direction opposite to such movement.

While parameters have been developed for the above-discussed desiderate, some experimentation may still be required to achieve the best results from the present seal assembly when employed in different applications and to provide the seal assembly 10 with its extremely long service life capability in severe and highly abrasive environments. To maximize this service life, it is desirable to limit the stresses experienced by the load ring 52 so that it does not incur premature fatigue failure.

In this regard, a coefficient of friction between the seal ring 50 and the cylinder surface 35 of between 0.1 and 0.3 has been found to be desirable. A frictional coefficient below 0.1 requires too high a radial load which would overstress the load ring 52 in compression. A coefficient of friction of greater than 0.3 increases the frictional force to such an extent that the shear force required to overcome the frictional force similarly overstresses the load ring 52. It is desirable that slip occur before the load ring 52 experiences a maximum strain of about 60%. To achieve the lower frictional coefficients, the nylon is preferably blended by weight with between 15 to 20% polytetrafluroethylene (PTFE) and approximately 2% silicon oil.

The elastomeric load ring 52 preferably has a shear modulus of between 380 kPa and 1400 kPa. A shear modulus of below 380 kPa would allow an excessive amount of deflection before producing the desired driving force. A shear modulus of greater than 1400 kPa would unduly restrict the dither movement capability of the seal assembly 10. It is also preferable that the load ring 52 have a Shore A durometer hardness within a range of between 45 and 75. Below 45 durometer Shore A hardness, the load ring 52 will abrade excessively. About 75 durometer Shore A, the load ring 52 will lack resilience.

In the described recoil mechanism application, dither movements of up to plus or minus 1.5 millimeters in the axial direction and plus or minus 0.6 millimeters in radial direction, as well as some small rotational movement, can be experienced. These dither movements can occur more than 100,000,000 times during the normal life of a track-type vehicle, with 140 megacycles of dither movement being typical. On the other hand, recoil or extended travel movement during such normal life would occur only about 200,000 times.

By way of example, a seal assembly 10 constructed in accordance with the present invention for the above recoil application had a seal ring 50 of a blend of type 6/6 nylon, 18% PTFE, and 2% silicon oil having 118 Rockwell R hardness. Such seal ring 50 was sealing against a chrome plated steel cylinder 16 with a 4 to 12 microinch RMS finish and provided a static coefficient of friction of about 0.15 in the presence of a light oil coating. The load ring 52 was of a neoprene rubber having a 55 durometer Shore A hardness and a shear modulus of 620 kPa. The cross-sectional radial height of the load ring 52 in a free state was radially compressed 17.5% by swagging of the retaining ring 58. This provided a width to height ratio of the load ring 52 after swagging of approximately 1 to 1. The load ring 52 provided an average radial force on the seal ring 50 of about 552 kPa. Slippage of the seal ring 50 occurred at about ±3.5 mm of axial deflection. The maximum strain which the load ring 52 experienced before slippage was approximately 45%.

A seal assembly 10 constructed in accordance with the present invention provides a dual sealing mode capability. The first or static sealing mode is effective in eliminating wear associated with movement between the seal ring 50 and the cylinder 16 during dither movement of the cylinder. In the second or dynamic sealing mode, the seal ring 50 slips upon the cylinder to allow unlimited movement of the cylinder without overstraining of the load ring 52. As a result, the present invention provides a seal having exceptionally long service life in severe applications where both extended travel and dither movements are encountered.

Other aspects and advantages of this invention can be obtained from a study of the drawings, the disclosure, and the appended claims.

I claim:

1. A radial seal assembly (10) adapted for sealing a movable member (16), comprising:
   an inner seal ring (50) positionable about said member (16);
   said seal ring (50) being of a tough, abrasion resistant material having a predetermined static coefficient of friction with said member (16);
   an elastomeric load ring (52) secured about said seal ring (50);
   means (54) for maintaining the load ring (52) in a radially compressed condition;
   said compressed condition of said load ring (52) in conjunction with said predetermined static coefficient of friction, providing a frictional force between said seal ring (50) and said member (16) sufficient to maintain said seal ring (50) in a static sealing mode relative to said member (16) during either movements of said member (16);
   said elastomeric load ring (52) having a shear force developed in response to extended travel movements of said member; and,
   said shear force being sufficient for overcoming said frictional force at a predetermined slip point.

2. The seal assembly of claim 1 wherein said predetermined slip point occurs before the stress of the load ring (52) exceeds a predetermined maximum.

3. The seal assembly of claim 2 wherein said predetermined maximum stress is sufficient to provide a fatigue life exceeding one megacycle.

4. The seal assembly of claim 1 wherein said material of said seal ring (50) is a nylon, polytetrafluoroethylene blend.

5. The seal assembly of claim 1 wherein said seal ring (50) is of a nylon type 6/6 and includes approximately 18% polytetrafluoroethylene and 2% silicone oil and has a static coefficient of friction with said member (16) of approximately 0.15.

6. The seal assembly of claim 1 wherein said means (54) for maintaining the load ring (52) in a radially compressed condition includes a metal retaining ring (58).

7. The seal assembly (10) of claim 1 including means (64) for preventing the load ring (52) from being overstrained in response to axial movement of said member (16).

8. The seal assembly (10) of claim 7 wherein said preventing means (64) includes a stop (64) disposed a predetermined axial distance (D) from said seal ring (50) and engageable with said ring (50) upon axial movement of said member (16) toward said stop (64).

9. A seal assembly (10) for a recoil mechanism (12) of a track-type vehicle, the recoil mechanism (12) having a housing (14) and a recoil cylinder (16) reciprocatively mounted within said housing (14), comprising:
   a retaining ring (58) secured to said housing (14);
   a seal ring (50) disposed about said cylinder (16);
   said seal ring (50) being of a nylon material and having a predetermined low static coefficient of friction with said cylinder (16) of between 0.1 to 0.3;
   an elastomeric load ring (52) disposed between and connected to said retaining and seal rings (58,50);
   said load ring (52) having a shear modulus sufficient to provide a predetermined shear force in response to axial deflection of said load ring (52); and,
   said retaining ring (58) being of a swaggable metal and sized to radially compress said load ring (52) and cause the load ring (58) to exert a predetermined radial load on said seal ring (50), said radial load, in conjunction with said static coefficient of friction, providing a frictional force sufficient to frictionally maintain said seal ring (50) in fixed sealable relationship against said cylinder (16) during dither movements of said cylinder, and said shear force being sufficient to overcome said frictional force and cause said seal ring to slip upon said cylinder in response to movement of said cylinder beyond a predetermined distance.

10. The seal assembly of claim 9 wherein slip occurs before the load ring (52) experiences a maximum strain of 60%.

11. The seal assembly of claim 10 wherein said radial load is sufficient to maintain a positive inwardly directed radial force on said seal ring during slip as well as during said fixed sealable relationship.

* * * * *